United States Patent [19]

Moon et al.

[11] Patent Number: 5,598,212
[45] Date of Patent: Jan. 28, 1997

[54] CONVERSION CIRCUIT FOR MUTUALLY CONVERTING BETWEEN PROGRESSIVE SCAN AND ZIG-ZAG SCAN VIDEO SIGNAL FORMATS

[75] Inventors: Yong S. Moon; Si J. Kim; Soon H. Jang, all of Seoul, Rep. of Korea

[73] Assignee: Korea Telecommunication Authority, Rep. of Korea

[21] Appl. No.: 506,783

[22] Filed: Jul. 25, 1995

[30] Foreign Application Priority Data

Feb. 25, 1995 [KR] Rep. of Korea ............... 94-17974

[51] Int. Cl.$^6$ ........................................ H04N 7/30
[52] U.S. Cl. ............................. 348/403; 348/390
[58] Field of Search ........................... 348/403, 390, 348/440, 441, 716, 718; H04N 7/30

[56] References Cited

U.S. PATENT DOCUMENTS

| | | | |
|---|---|---|---|
| 5,189,526 | 2/1993 | Sasson | 348/403 |
| 5,196,930 | 3/1993 | Kadono | 348/403 |
| 5,502,491 | 3/1996 | Sugiyama | 348/403 |
| 5,510,904 | 4/1996 | Itoi | 348/403 |

*Primary Examiner*—Victor R. Kostak
*Attorney, Agent, or Firm*—Merchant, Gould, Smith, Edell, Welter & Schmidt

[57] ABSTRACT

A scanning format conversion circuit for performing the mutual conversion between a progressive scanning format and a zig-zag scanning format to read or write N×N discrete cosine transform coefficients from or into a memory in a coding process or a decoding process of a video system. The scanning format conversion circuit comprises a pure logic circuit including an up/down counting circuit, a down counting circuit, first to third selection circuits, a comparison circuit, a phase change circuit, and an accumulation circuit. With this construction, the mutual conversion between the progressive scanning format and the zig-zag scanning format is performed on the basis of the rule between the input orders and the actual positions of the discrete cosine transform coefficients. Therefore, the scanning format conversion circuit is capable of simplifying the implementation of ASIC and performing the scanning format conversion operation regardless of a block size.

8 Claims, 4 Drawing Sheets

| col\row | 0 | 1 | 2 | 3 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |

Fig. 1

| col\row | 0 | 1 | 2 | 3 |
|---|---|---|---|---|
| 0 | 0 | 1 | 5 | 6 |
| 1 | 2 | 4 | 7 | 12 |
| 2 | 3 | 8 | 11 | 13 |
| 3 | 9 | 10 | 14 | 15 |

Fig. 2

| Input order | Actual position | Difference |
|---|---|---|
| 0 | 0 | 1 |
| 1 | 1 | 3 |
| 2 | 4 | 4 |
| 3 | 8 | -3 |
| 4 | 5 | -3 |
| 5 | 2 | 1 |
| 6 | 3 | 3 |
| 7 | 6 | 3 |
| 8 | 9 | 3 |
| 9 | 12 | 1 |
| 10 | 13 | -3 |
| 11 | 10 | -3 |
| 12 | 7 | 4 |
| 13 | 11 | 3 |
| 14 | 14 | 1 |
| 15 | 15 | |

Fig. 3

CONVERSION CIRCUIT FOR MUTUALLY CONVERTING BETWEEN PROGRESSIVE SCAN AND ZIG-ZAG SCAN VIDEO SIGNAL FORMATS

BACKGROUND OF THE INVENTION

1. Field of the Invention

The present invention relates to a scanning format conversion circuit comprising a pure logic circuit to convert a progressive scanning format employed by the moving picture expert group (referred to hereinafter as MPEG) into a zig-zag scanning format and vice versa.

2. Description of the Prior Art

For the efficient compression of a video signal, the MPEG employs discrete cosine transform (referred to hereinafter as DCT), quantization, variable length code (referred to hereinafter as VLC) and motion vector estimation techniques.

The DCT technique is adapted to produce a two-dimensional array of DCT coefficients according to a spatial frequency characteristic. In the two-dimensional array of DCT coefficients, higher frequency components are diagonally distributed to the lower right hand side beginning with the upper left hand side in which the lowest frequency component is present. The DCT coefficients can be expressed as several values by the quantization technique. The statistically quantized DCT coefficient values which are not "0" are mostly distributed at a lower frequency domain, whereas the values of "0" frequently appear at a higher frequency domain.

The VLC technique is adapted to scan the quantized DCT coefficient values to produce codes in the form of pairs: run R and length L. The run R indicates the number of times that "0" appears and the length L indicates the quantized DCT coefficient value.

Because the frequency components are diagonally advanced from the lower frequency domain to the higher frequency domain and the values of "0" frequently appear in such a direction, it is much more efficient in the data compression technique to perform the coding operation using a zig-zag scanning manner rather than a progressive scanning manner.

Therefore, the MPEG proposes that the coding and decoding operations be performed through the mutual conversion between a progressive scanning format and a zig-zag scanning format.

FIG. 1 is a view illustrating a two-dimensional array of 4×4 DCT coefficients, and FIG. 2 is a view illustrating the order when the DCT coefficients in FIG. 1 are scanned in the zig-zag manner.

Generally, the scanning format conversion signifies the conversion between the data orders in FIGS. 1 and 2.

A variable length coder requires an address generator for reading DCT coefficients from a memory in the zig-zag scanning order, whereas a variable length decoder requires an address generator for writing data of the zig-zag scanning format into a memory in the progressive scanning order. In result, the address generator signifies a scanning format conversion circuit.

The address generator is implemented using a read only memory (referred to hereinafter as ROM) table in which the scanning order is stored. In other words, data in the ROM table is used as an address for reading or writing data from or into a random access memory (referred to hereinafter as RAM). However, the ROM table acts merely to map data. For this reason, the address generator is high in its processing speed, but not suitable to the implementation of application specific integrated circuit (referred to hereinafter as ASIC).

SUMMARY OF THE INVENTION

Therefore, the present invention has been made in view of the above problem, and it is an object of the present invention to provide a scanning format conversion circuit comprising a pure logic circuit to simplify the implementation of ASIC.

In accordance with the present invention, the above and other objects can be accomplished by a provision of a scanning format conversion circuit for performing the mutual conversion between a progressive scanning format and a zig-zag scanning format to read or write N×N discrete cosine transform coefficients from or into a memory in a coding process or a decoding process of a video system.

In an embodiment of the present invention, the scanning format conversion circuit comprises up/down counting means for performing an up counting operation from 1 to N−1 and then a down counting operation from N−1 to 1, the up/down counting means being loaded with 1 at its initial state and then controlled in response to a carry signal in such a manner that it holds its count until the carry signal is generated; down counting means being loaded with an output value from the up/down counting means to perform a down counting operation from the loaded value to 0, the down counting means generating the carry signal at the moment that its count becomes 0, and then applying the generated carry signal to the up/down counting means; first selection means for inputting the carry signal from the down counting means as its selection control signal, the first selection means selecting in turn N−1 and −(N−1) in response to the carry signal from the down counting means; second selection means for inputting the carry signal from the down counting means as its selection control signal, the second selection means selecting in turn 1 and N in response to the carry signal from the down counting means; third selection means for inputting the carry signal from the down counting means as its selection control signal, the third selection means selecting one of output signals from the first and second selection means in response to the carry signal from the down counting means; comparison means for comparing the output value from the up/down counting means with N−1; phase change means for changing an output phase of the second selection means in response to an output signal from the comparison means so that only one of 1 and N can be repeatedly selected by the second selection means about the time that N−1 or −(N−1) is selected (N−1) times by the first selection means while 1 and N are in turn selected by the second selection means; and accumulation means for accumulating an output signal from the third selection means to generate an address output signal; whereby the mutual conversion between the progressive scanning format and the zig-zag scanning format is performed on the basis of the rule between the input orders and the actual positions of the discrete cosine transform coefficients.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view illustrating a two-dimensional array of 4×4 DCT coefficients;

FIG. 2 is a view illustrating the order when the DCT coefficients in FIG. 1 are scanned in a zig-zag manner;

FIG. 3 is a view illustrating the comparison between the input order of 4×4 DCT coefficients and the actual positions thereof;

DETAILED DESCRIPTION OF THE PREFERRED EMBODIMENTS

Referring to FIG. 3, there is shown one example of data block with a 4×4 size. In practice, in the case of a data block with an N×N size, where N≧2, there are four differences between the actual positions of the present and previous data, namely, 1, N−1, −(N−1) and N. The four differences are repeatedly produced, in the order 1, N−1, N, −(N−1), −(N−1), 1, N−1, N−1, N−1, M, ...

The rule of the differences being produced as mentioned above can be summarized as follows.

Firstly, the first and last are always "1".

Secondly, N−1 and −(N−1) are in turn produced with the number of times being incremented by one. That is, N−1 is once, −(N−1) is twice, N−1 is three times and −(N−1) is four times.

Thirdly, if any one of N−1 and −(N−1) is produced (N−1) times with the number of times being incremented by one, then they are produced with the number of times being decremented by one. For example, N−1 is produced (N−1) times if N is an even number, whereas −(N−1) is produced (N−1) times if N is an odd number.

Fourthly, 1 and N are in turn inserted once before and after N−1 or −(N−1) is produced. Then, only one of 1 and N is repeated about the time that N−1 or −(N−1) is produced (N1) times. Namely, 1 is repeated if N is an even number, whereas N is repeated if it is an odd number.

Figure 4:
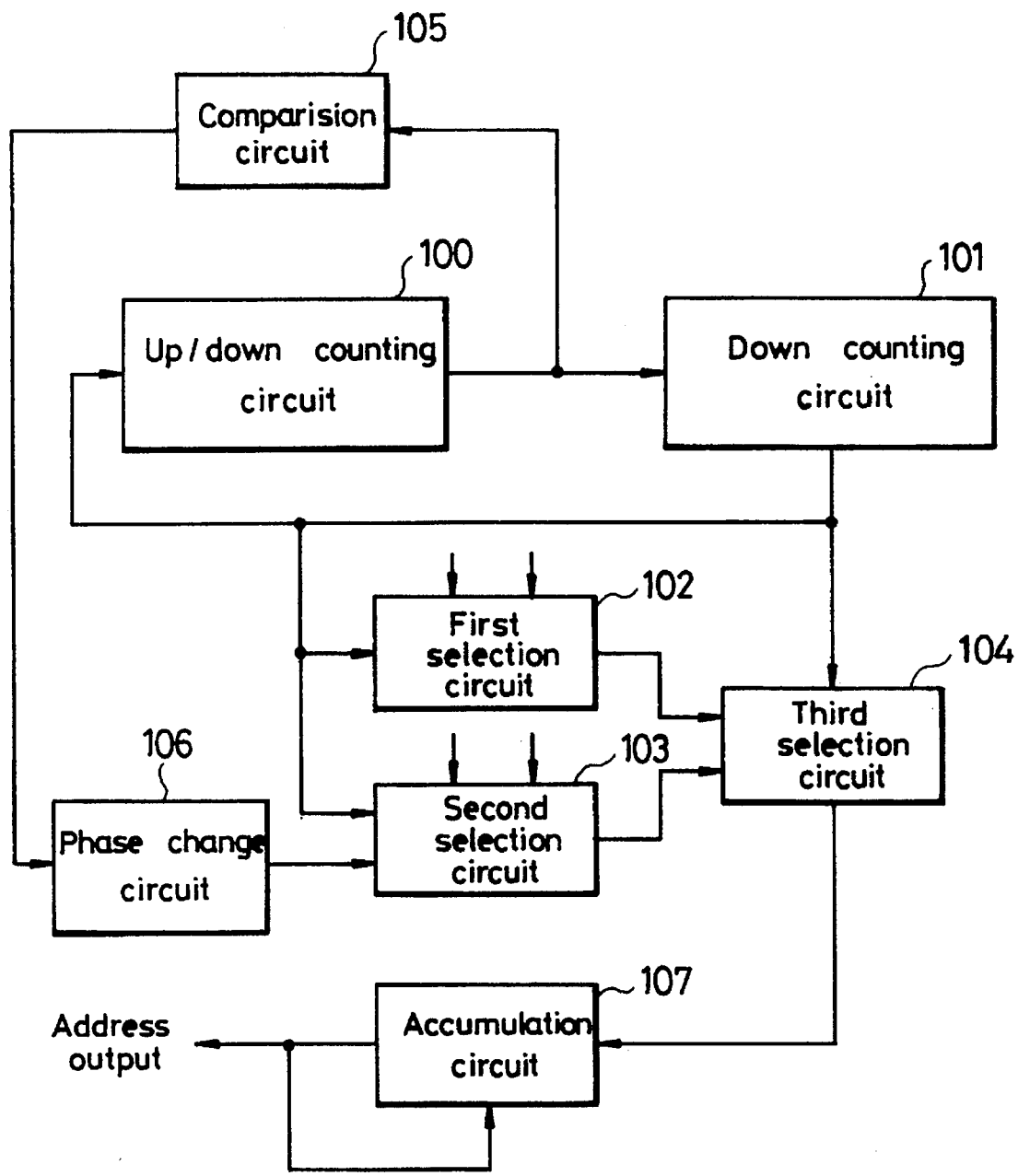
FIG. 4 is a block diagram of a scanning format conversion circuit in accordance with an embodiment of the present invention.

Referring to FIG. 4, there is a block diagram of a scanning format conversion circuit which is constructed on the basis of the above-mentioned rule in accordance with an embodiment of the present invention. As shown in this drawing, the scanning format conversion circuit comprises an up/down counting circuit 100, a down counting circuit 101, first to third selection circuits 102–104, a comparison circuit 105, a phase change circuit 106, and an accumulation circuit 107.

The operation of the scanning format conversion circuit with the above-mentioned construction in accordance with the embodiment of the present invention will hereinafter be described in detail with reference to FIG. 4.

The up/down counting circuit 100 is adapted to perform an up counting operation from 1 to N−1 and then a down counting operation from N−1 to 1. The up/down counting circuit 100 is loaded with 1 at its initial state and then controlled in response to a carry signal from the down counting circuit 101 in such a manner that it holds its count until the carry signal is generated from the down counting circuit 101.

The down counting circuit 101 is loaded with an output value from the up/down counting circuit 100. Then, the down counting circuit 101 performs a down counting operation from the loaded value to 0. The down counting circuit 101 generates the carry signal at the moment that its count becomes 0, and then applies the generated carry signal to the up/down counting circuit 100.

The first selection circuit 102 is adapted to input the carry signal from the down counting circuit 101 as its selection control signal. The first selection circuit 102 selects in turn N−1 and −(N−1) in response to the carry signal from the down counting circuit 101.

The second selection circuit 103 is adapted to input the carry signal from the down counting circuit 101 as its selection control signal. The second selection circuit 103 selects in turn 1 and N in response to the carry signal from the down counting circuit 101.

The third selection circuit 104 is adapted to input the carry signal from the down counting circuit 101 as its selection control signal. The third selection circuit 104 selects one of output signals from the first and second selection circuits 102 and 103 in response to the carry signal from the down counting circuit 101.

The comparison circuit 105 is adapted to compare the output value from the up/down counting circuit 100 with N−1.

The phase change circuit 106 is adapted to change an output phase of the second selection circuit 103 in response to an output signal from the comparison circuit 105 so that only one of 1 and N can be repeatedly selected by the second selection circuit 103 about the time that N−1 or −(N−1) is selected (N−1) times by the first selection circuit 102 while 1 and N are in turn selected by the second selection circuit 103.

The accumulation circuit 107 is adapted to accumulate an output signal from the third selection circuit 104 to generate an address output signal.

Figure 5:
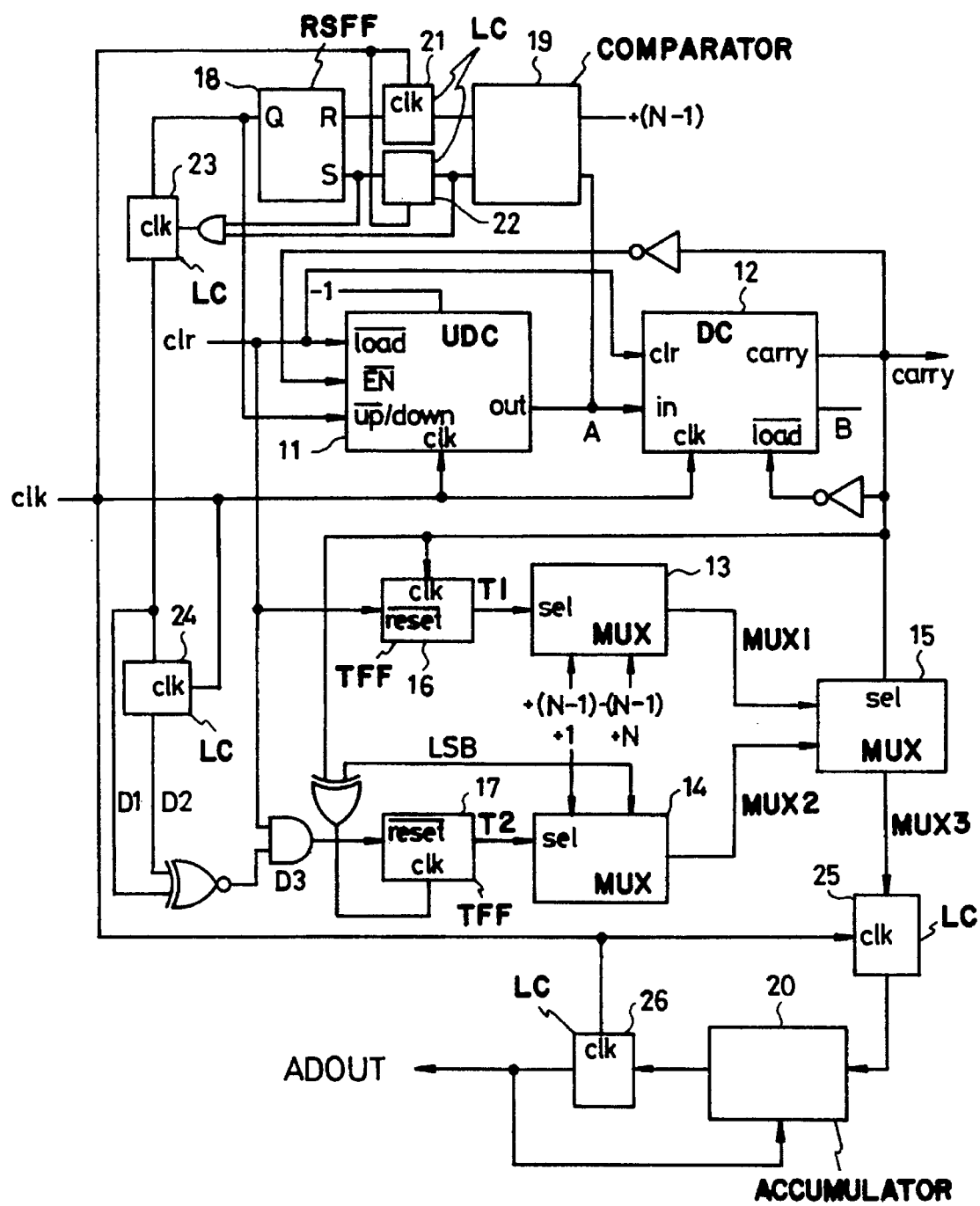
FIG. 5 is a detailed circuit diagram of the scanning format conversion circuit in FIG. 4 in accordance with the embodiment of the present invention.

Referring to FIG. 5, there is shown a detailed circuit diagram of the scanning format conversion circuit in FIG. 4 in accordance with the embodiment of the present invention. As shown in this drawing, the up/down counting circuit 100 is provided with an up/down counter (UDC) 11 for performing the up/down counting operations. The down counting circuit 101 is provided with a down counter (DC) 12 for performing the down counting operation. The first selection circuit 102 includes a first toggle flip-flop (TFF) 16 and a first multiplexer (MUX) 13. The second selection circuit 103 includes a second toggle flip-flop 17 and a second multiplexer 14. The third selection circuit 104 is provided with a third multiplexer 15. The comparison circuit 105 is provided with a comparator 19. The phase change circuit 106 includes first to fourth latch circuits (LC's) 21–24 and an RS flip-flop (RSFF) 18. The accumulation circuit 107 includes fifth and sixth latch circuits 25 and 26 and an accumulator 20.

The operation of the scanning format conversion circuit with the above-mentioned construction in accordance with the embodiment of the present invention will hereinafter be described in more detail with reference to FIG. 5.

First, a reference clock signal clk is applied to the up/down counter 11, the down counter 12 and the latch circuits 21, 22, 24, 25 and 26, and a start signal clr is applied to the up/down counter 11, the down counter 12 and the first and second toggle flip-flops 16 and 17.

Upon receiving the reference clock signal clk and the start signal clr, the up/down counter 11 performs the up counting operation from 1 to N−1. Then, the up/down counter 11 performs the down counting operation from N−1 to 1 in response to an output signal from the RS flip-flop 18 at the moment that its count becomes N−1. The down counter 12 is loaded with an output value from the up/down counter 11. Then, the down counter 12 performs the down counting operation from the loaded value to 0. The down counter 12 generates the carry signal at the moment that its count becomes 0, the carry signal being enabled to 1.

In other words, upon receiving the start signal clr, the up/down counter 11 is loaded with 1 to perform the up counting operation. At this time, the up/down counter 11 is enable by the output signal or the carry signal from the down counter 12. As a result, the up/down counter 11 holds its count until the output signal from the down counter 12 becomes 1. Namely, the up/down counter 11 holds its output value until the down counter 12 ends its down counting operation for the previous values.

The down counter 12 is load-enabled when its output signal becomes 1. As a result, the down counter 12 is loaded with the output value from the up/down counter 11.

For example, in the case where the output value from the up/down counter 11 is 2, the down counter 12 performs the down counting operation from 1 to 0. Upon counting 0, the down counter 12 transfers the carry signal to the up/down counter 11 to enable it. The carry signal from the down counter 12 is also applied as a load enable signal to the down counter 12. As a result, new values are counted by both the up/down counter 11 and the down counter 12.

As compared with the up/down counter 11, the down counter 12 generates its output at an interval corresponding to the loaded value.

For example, if the loaded value is 2, then 2 and 1 are counted between 0 and 0, resulting in the interval being 2. Also, if the loaded value is 3, then 3, 2 and 1 are counted between 0 and 0, resulting in the interval being 3.

The first toggle flip-flop 16 generates repeatedly 1 and 0 in response to the output signal or the carry signal from the down counter 12. Then, the first toggle flip-flop 16 applies its output signal T1 as a selection control signal sel to the first multiplexer 13.

The first multiplexer 13 outputs N−1 when the output signal T1 from the first toggle flip-flop 16 is 1 and −(N−1) when the output signal T1 from the first toggle flip-flop 16 is 0. At this time, because the down counter 12 generates its output at an interval corresponding to the loaded value, the first multiplexer 13 generates N−1 or -(N−1) at the corresponding interval.

The comparator 19 compares the output value from the up/down counter 11 with N−1. If the output value from the up/down counter 11 is the same as N−1 as a result of the comparison, the comparator outputs 1, thereby causing the RS flip-flop 18 to output 1. The output value from the RS flip-flop 18 is latched into the third latch circuit 23 at the moment that the up/down counter 11 starts the down counting operation, namely, the second latch circuit 22 outputs 1 and the comparator 19 outputs 0.

An output signal D2 from the fourth latch circuit 24 is obtained by delaying an output signal D1 from the third latch circuit 23 by one clock cycle. The output signals D1 and D2 from the third and fourth latch circuits 23 and 24 are exclusive-NORed and then ANDed with the start signal clr. The resultant signal D3 is applied to a reset terminal of the second toggle flip-flop 17. As a result, the second toggle flip-flop 17 is reset by the signal D3 when the up/down counter 11 starts the down counting operation again. Upon being reset, the second toggle flip-flop 17 generates repeatedly 1 and 0 again from the beginning.

Unlike the first toggle flip-flop 16, the second toggle flip-flop 17 does not receive only the carry signal from the down counter 12 as its clock. Namely, the second toggle flip-flop 17 receives as the clock the result obtained by exclusive-ORing a least significant bit (LSB) of N and the carry signal from the down counter 12. This reason is to operate the circuit normally regardless of whether N is an odd or even number. In other words, in the case where N is an odd number, 1 must not be repeated but N must be repeated at the moment that the up/down counter 11 starts the down counting operation, as seen from the above-mentioned rule. For this reason, it is advantageous to invert a waveform of an output signal T2 from the second toggle flip-flop 17.

In the case where N is an even number, the second multiplexer 14 outputs 1 when the output signal T2 from the second toggle flip-flop 17 is 1 and N when the output signal T2 from the second toggle flip-flop 17 is 0. If N is an odd number, the second multiplexer 14 generates its output value in the opposite manner to the case where N is an even number, i.e. the second multiplexer 14 outputs N when the output signal T2 is 1 and outputs 1 when the output signal T2 is 0.

The third multiplexer 15 receives the carry signal from the down counting circuit 101 as its selection control signal. The third multiplexer 15 selects one of output values MUX1 and MUX2 from the first and second multiplexers 13 and 14 in response to the carry signal from the down counter 12.

An output value MUX3 from the third multiplexer 15 is latched into the fifth latch circuit 25 and then added with an output value from the sixth latch circuit 26 by the accumulator 20. In result, the accumulator 20 sends its output signal as an address output signal ADOUT through the sixth latch circuit 26.

As apparent from the above description, according to the present invention, the scanning format conversion circuit is provided with the pure logic circuit to convert the progressive scanning format into the zig-zag scanning format and vice versa, thereby simplifying the implementation of ASIC. Therefore, the scanning format conversion circuit can perform the scanning format conversion operation regardless of a block size as compared with the conventional one in which a ROM size is varied as the block size is varied.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning format conversion circuit for performing the mutual conversion between a progressive scanning format and a zig-zag scanning format to read or write N×N discrete cosine transform coefficients from or into a memory in a coding process or a decoding process of a video system, comprising:

up/down counting means for performing an up counting operation from 1 to N−1 and then a down counting operation from N−1 to 1, said up/down counting means being loaded with 1 at its initial state and then controlled in response to a carry signal in such a manner that it holds its count until the carry signal is generated;

down counting means being loaded with an output value from said up/down counting means to perform a down counting operation from the loaded value to 0, said down counting means generating the carry signal at the moment that its count becomes 0, and then applying the generated carry signal to said up/down counting means;

first selection means for inputting the carry signal from said down counting means as its selection control signal, said first selection means selecting in turn N−1 and −(N−1) in response to the carry signal from said down counting means;

second selection means for inputting the carry signal from said down counting means as its selection control signal, said second selection means selecting in turn 1 and N in response to the carry signal from said down counting means;

third selection means for inputting the carry signal from said down counting means as its selection control signal, said third selection means selecting one of output signals from said first and second selection means in response to the carry signal from said down counting means;

comparison means for comparing the output value from said up/down counting means with N−1;

phase change means for changing an output phase of said second selection means in response to an output signal from said comparison means so that only one of 1 and N can be repeatedly selected by said second selection means about the time that N−2 or −(N−1) is selected (N−1) times by said first selection means while 1 and N are in turn selected by said second selection means; and accumulation means for accumulating an output signal from said third selection means to generate an address output signal;

whereby the count of the up/down counting means, corresponding to either a progressive scanning position or a zig-zig scanning position, results in the generation of an address output signal, corresponding respectively to the zig-zag scanning position or the progressive scanning position.

2. A scanning format conversion circuit to mutually convert an N×N matrix of coefficients between a progressive format and a zig-zag format, comprising:

an up/down counting circuit to count from 1 to N−1 and then to count from N−1 to 1, being controlled to hold a count until receiving a carry signal, and to generate an output value;

a down counting circuit to receive said output value from said up/down counting circuit and to count down from said output value to zero, to generate said carry signal upon reaching zero and to apply said carry signal to said up/down counting circuit;

a first selecting circuit to select in turn between N−1 and −(N−1) as a first control signal in response to said carry signal from said down counting circuit;

a second selecting circuit to select in turn between 1 and N as a second control signal in response to said carry signal from said down counting circuit;

a third selecting circuit to select between said first control signal from said first selecting circuit and said second control signal from said second selecting circuit as a third output signal in response to said carry signal;

a comparing circuit to compare said output value from said up/down counting circuit with N−1 and to generate a compare output signal;

a phase changer to change output phase of said second selecting circuit in response to said compare output signal so that said second selecting circuit repeatedly selects only one of 1 and N when either N−1 or −(N−1) is selected N−1 times by said first selecting circuit; and an accumulating circuit to accumulate said third output signal to generate an address output signal;

whereby counts on said up/down counting circuit, corresponding to either a progressive format or a zig-zag format, produce address output signals corresponding respectively to either a zig-zag format or a progressive format.

3. The scanning format conversion circuit of claim 2, wherein said up/down counting circuit comprises an up/down counter loaded with 1 in an initial state.

4. The scanning format conversion circuit of claim 2, wherein said down counting circuit comprises a down counter being load enabled when said carry signal becomes 1 so as to receive said output value from said up/down counting circuit.

5. The scanning format conversion circuit of claim 2, wherein said first selecting circuit comprises a first multiplexer controlled by a first toggle flip-flop, wherein said first multiplexer selects N−1 as said first control signal when said first toggle flip-flop outputs a 1 and −(N−1) as the said first control signal when said first toggle flip-flop outputs a 0.

6. The scanning format conversion circuit of claim 2, wherein said second selecting circuit comprises a second multiplexer controlled by a second toggle flip-flop, wherein said second multiplexer selects 1 as said second control signal when said second toggle flip-flop outputs a 1 and N as said second control signal when said second toggle flip-flop outputs a 0.

7. The scanning format conversion circuit of claim 2, wherein said third selecting circuit comprises a third multiplexer controller by said carry signal and a first latch circuit to store a multiplexer output signal from said third multiplexer, wherein said third output signal is output from said first latch circuit.

8. The scanning format conversion circuit of claim 2, wherein said accumulating circuit comprises an accumulator and a second latch circuit, wherein said second latch circuit stores a previous output address signal and said accumulator adds said third output signal to said previous output address signal so as to generate a new output address signal.

* * * * *